Dec. 16, 1952      J. W. WATSON      2,621,922
LEAF-END FRICTION BEARING STRUCTURE
AND ANCHORAGE THEREFOR
Filed April 25, 1947      2 SHEETS—SHEET 1
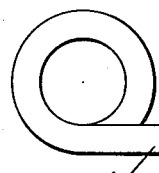
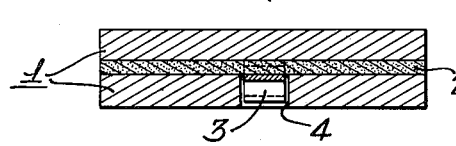
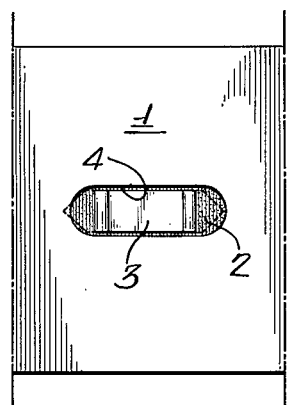
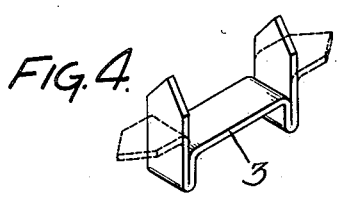
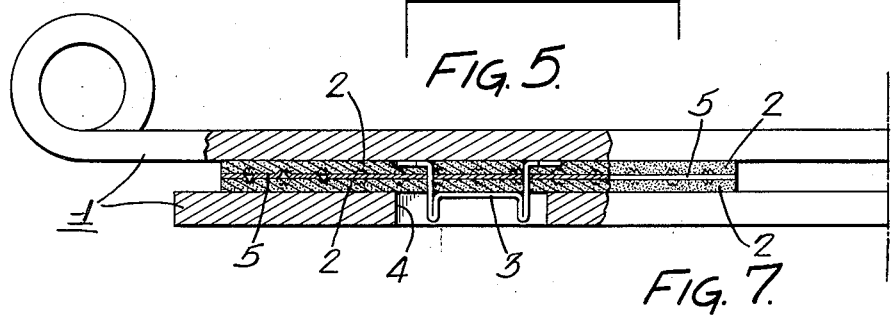
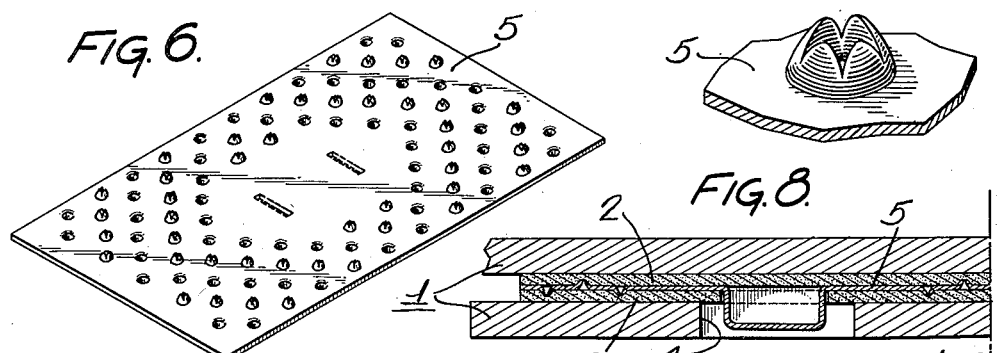
Inventor:
John Warren Watson
by his Attorneys
Howson & Howson Dec. 16, 1952     J. W. WATSON     2,621,922
LEAF-END FRICTION BEARING STRUCTURE
AND ANCHORAGE THEREFOR
Filed April 25, 1947     2 SHEETS—SHEET 2
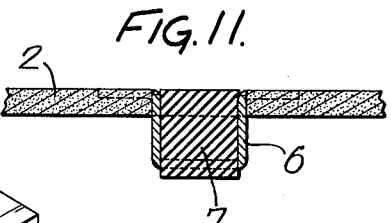
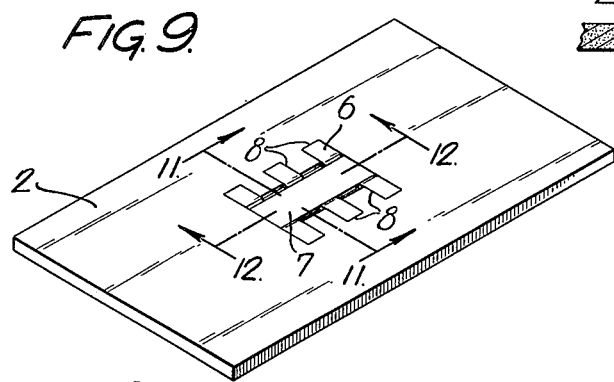
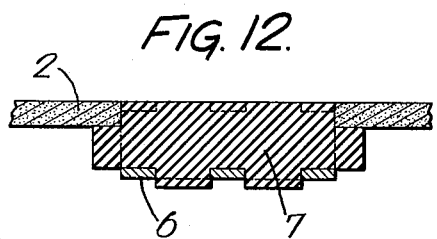
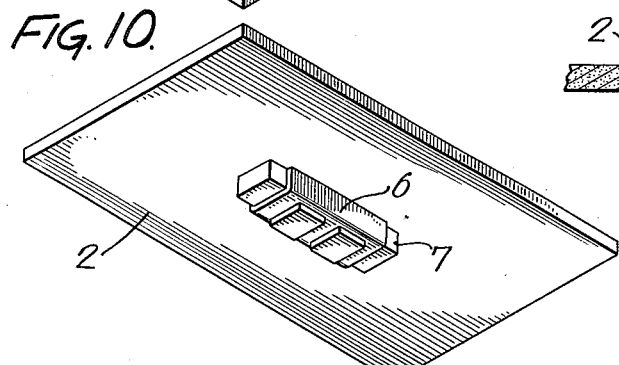
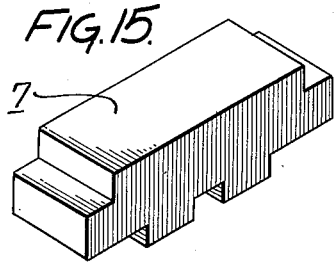
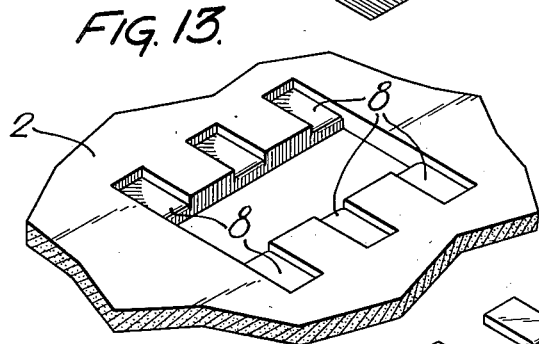
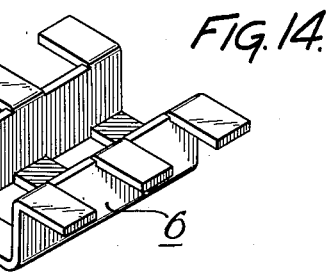
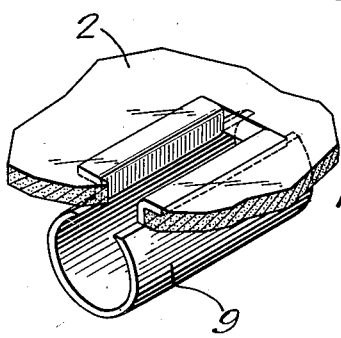
Inventor:
John Warren Watson
by his Attorneys
Howson & Howson Patented Dec. 16, 1952

2,621,922

UNITED STATES PATENT OFFICE 2,621,922

LEAF-END FRICTION BEARING STRUCTURE AND ANCHORAGE THEREFOR

John W. Watson, Wayne, Pa., assignor to John Warren Watson Company, Philadelphia, Pa., a corporation of Pennsylvania Application April 25, 1947, Serial No. 743,997

26 Claims. (Cl. 267—49)

This invention relates to a friction bearing structure for spacing two bodies which are subject to relative reciprocating movements, and to novel means for anchoring said bearing structure with relation to one of said bodies, and in particular to a bearing structure of this character for spacing the end portions of two adjacent leaves of a multiple leaf spring.

A particular object of my invention is to provide for relative shear movements between the friction bearing structure and both of said bodies.

A further particular object of my invention is to limit the extent of relative shear movements between the friction bearing structure and one of said bodies.

A still further object of my invention is to provide, by means of a short and hence relatively inexpensive leaf-end friction bearing structure, the same apportionment of shear movements between the spring leaves and both top and bottom surface of the leaf-end structure as is apportioned between the spring leaves and both top and bottom surface of an end of a full length liner. Only at the ends of a full length liner is any frictional work done.

In the attached drawings:

Fig. 1 is a fragmentary side elevation showing two leaves of a leaf spring, partly in section to illustrate my novel anchoring means.

Fig. 2 is a cross section on line 2—2, Fig. 1.

Fig. 3 is a plan view showing an elongated hole in the second leaf and the anchorage means lying therewithin.

Fig. 4 is a perspective view showing the anchorage member in detail.

Fig. 5 is a modification of Fig. 1 showing a double friction bearing structure.

Fig. 6 is a perspective view of a plate for anchoring the two bearing structures against shear relative movements.

Fig. 7 is an enlarged view showing one of the punctured projections in the plate illustrated in Fig. 6.

Fig. 8 is a fragmentary view of the plate illustrated in Fig. 6 but carrying an integral lug as the anchorage means for interengagement with the elongated hole.

Fig. 9 shows a leaf-end friction bearing structure equipped with an alternate form of anchorage means.

Fig. 10 shows the opposite side of the bearing structure and anchoring members.

Fig. 11 is a section on line 11—11, Fig. 9.

Fig. 12 is a section on line 12—12, Fig. 9.

Fig. 13 is a fragmentary perspective view showing the friction bearing structure with the anchorage member or members removed.

Fig. 14 is a perspective view showing an anchor member which may be used per se or as one member of the anchoring assembly shown in Figs. 9, 10, 11 and 12.

Fig. 15 is a perspective view showing the other member of the above anchoring assembly.

Fig. 16 is a fragmentary view in perspective showing a friction member equipped with a second alternate form of anchor member.

Referring to Figs. 1, 2, 3 and 4, numeral 1 designates each of two adjacent leaves of a leaf spring. Numeral 2 designates a leaf-end friction bearing structure of any suitable construction such for example as textile fabric impregnated and coated with suitable friction material, saturating paper similarly impregnated and coated, or other construction presenting a yieldable and conformable surface to one or both of the spring leaves and exhibiting frictional properties whereof the static and dynamic coefficients of friction are sufficiently in balance to avoid setting up destructive spasmodic actions and/or objectionable noises. In this connection reference may be made to patent of Robert F. Nowalk, dated February 16, 1932, Serial No. 1,845,090. Numeral 3 designates a preformed elongated anchor member of steel or other rigid material, and Numeral 4 designates an elongated straight-sided hole in one of said leaves adjacent an end thereof.

Referring to the elongated hole shown in the lower leaf in Figs. 1, 2 and 3, and particularly as shown in Fig. 3, it will be noted that that portion of the hole which lies between its two parallel sides is longer than the portion of the anchor member which lies within the hole. This permits a floating action of the bearing structure which is an important feature of my invention. I prefer that the difference between these two lengths be equal approximately to one-half of the maximum movement between the two spring leaves adjacent their ends. This would give a 50–50 float between the bearing structure and each of the two spring leaves. In connection with the relative length of hole and anchor member, and the extent of float thus provided, it should be noted that, in an orthodox multiple leaf spring, successive leaves are made successively shorter and consequently the relative movements between the ends of successive pairs of leaves are shorter. It is seen therefore that if movements between the bearing structure and the leaves making up each pair, are to be limited to an approximate 50–50 ratio, the "interengaging means" between the bearing structure and each of the various leaves must be differently proportioned. Assuming that the "interengaging means" consist of a projection carried by the bearing structure and an elongated hole carried by the leaf, as shown in the examples herewith, the above procedure would require, for example, the punching of holes of different length at the ends of each leaf of different length. Such procedure, from a manufacturing standpoint would be confusing to say the least. Such practice could hardly be tolerated and would not be necessary. Manufacturing expedience would dictate that holes of the same length be provided in all leaves regardless of their individual lengths. The length of hole decided upon might be that which would be required to give a 50–50 movement between the bearing structure and the two longest leaves, or a compromise hole of somewhat shorter length might be preferred, and decided upon, in order to avoid too great a floating action between the bearing structure and the shorter leaves. Such shorter hole might be designed to provide a 50–50 movement between the bearing structure and the two longest leaves over only average roads for example. Over abnormally rough roads, which on occasion might cause the car to bottom against the bumpers, the ratio might safely be unbalanced to the extent of 60–40 movements, for example, between the bearing structure and the upper and lower leaves respectively. This would result in an unbalance of movements and wear against the upper and lower surfaces of the bearing structure only on such rare occasions and would not be detrimental. Customary practice in the use of end spacers between adjacent leaves of multiple leaf springs is to anchor the spacer with respect to one leaf and thus require that all movements take place between the spacer and the other leaf. Movements however, unavoidably do occur between the spacer and the leaf to which it is anchored because of necessary commercial manufacturing tolerances on both of the meshing parts. These relatively small movements are not to be taken as the appreciable movements contemplated by applicant's invention.

Referring to Figs. 5, 6 and 7, numeral 1 designates each of two adjacent leaves of a leaf spring. Numeral 2 designates each of two friction bearing structures which, together with an anti-shear plate designated by numeral 5, act to space said leaves. Numeral 3 designates an elongated anchor member and numeral 4 designates an elongated hole in one of said leaves. Fig. 8 shows a total assembly similar to that shown in Fig. 5 with the exception that the anchoring projection is formed from the plate 5 as an integral portion thereof.

Referring to Figs. 9, 10, 11, 12, 13, 14 and 15, numeral 2, as in Fig. 1, designates a friction bearing structure for spacing two leaves of a leaf spring adjacent their ends. Numeral 6 designates an elongated and preformed anchor member which, as shown in detail in Fig. 14, is provided with a plurality of outwardly extending leg portions designed for embedment in the preformed depressions 8, in bearing structure 2, Fig. 13. This embedded engagement between anchor member 6 and bearing structure 2 is securely maintained while in service by the pressure between the spring leaves acting equally against both sides of the assembly. Anchor member 6 being carried by and being thus held in locked position with relation to bearing structure 2 is capable of serving, alone, as an anchor member to positively limit relative movements between the bearing structure and one of the leaves. Numeral 7 designates an anchor member of soft rubber or other suitably deformable material. When this anchor member 7 is employed, anchor member 6 acts to hold it in secure attached position with relation to bearing structure 2 and, conversely, rubber member 7, when employed, acts to attach anchor member 6 to bearing structure 2. This rubber member 7, by suitable durometer specification, may be designed to fill approximately the full length of the elongated hole in the spring leaf or it may be designed in any desired length shorter than the elongated hole. In either event, because of its deformability, an appreciable movement between the bearing structure and that leaf may be provided for.

To assemble the anchoring members 6 and 7 with relation to bearing structure 2, member 6 is dropped into the rectangular hole in structure 2 and the rubber member 7 is then bent down at its ends and these end portions pinched together. These end portions are then pushed into the bottom of the cavity formed by part 6, and released. By then pushing down on the center of the rubber member its ends are forced outwardly between the bottom of the cavity and the underside of the bearing structure.

Because of a considerable saving in cost I prefer the use of anchor member 6, alone, and particularly between the shorter leaves where the duty is less severe. Between the longer leaves, however, and where sustained performance for high mileage is demanded, I prefer the addition of member 7 as the contact between it and either end of the elongated hole will be gently and progressively cushioned in correcting any unbalanced forces which may possibly occur between the bearing structure and the two opposing leaves.

Referring to Fig. 16, numeral 9 designates an elongated anchor member of spring steel or other suitably resilient material which, by lateral compression followed by release, is inserted in the rectangular hole in member 2 and then permitted to spring back and lock itself in position between and against the opposite edges of the hole.

The several forms of anchoring means shown by the drawings are merely by way of example. Numberless other forms could be designed to carry out my invention which essentially is to provide for a limited extent of longitudinal floating of a leaf-end friction bearing structure with relation to both of two relatively reciprocating bodies and in particular with relation to the end portions of both of two adjacent leaves of a leaf spring as is provided for in the examples herewith by an elongated hole, in one of the leaves, of greater length than the length of the projecting anchorage means carried by the bearing structure.

By permitting the friction bearing structure to float between the two leaves, it will readily be seen that the bearing structure is acted upon, equally, by each of the two leaves. As the leaf ends are caused to move with relation to each other, the frictional resistance between one of the leaves and the bearing structure will tend to cause the bearing structure to travel with that leaf, but the frictional resistance between the bearing structure and the other leaf will tend to cause the bearing structure to travel in the opposite direction. Thus it will be seen that the bearing structure, as a result of these opposing and equal forces, will slide equally with relation to both of said leaves and, in effect, stand still between them. Inasmuch, however, as these opposing forces cannot be counted upon at all times and under all conditions to be exactly equal, the extent of movements in either direction must be limited. Should any discrepancies between the forces be encountered, these discrepancies will be found to be quite minor and hence it will require but a very slight correcting force to bring about a balance.

In the employment of leaf-end friction bearing structures it has heretofore been the practice to fixedly anchor the bearing structure adjacent the end of one of the two leaves. As a result, the whole frictional movement is made to take place between the bearing structure and the other leaf. This naturally requires a very strong bond between the friction bearing structure and the anchorage projection carried by it. In contrast, the anchorage projection in my invention acts merely to correct any small unbalance between the opposing forces set up by the relative movements between the two leaves. This difference in required strength of bond between the friction bearing structure and its anchorage projection is extremely important if the friction material to be used is of a relatively frail structure such, for example, as impregnated paper or impregnated strips of thin fabric material.

In the case of full length liners the anchorage takes place at the center of the spring where there is no relative movement between the leaves and where the leaves are held tightly bound together. The action between the ends of the leaves and the ends of the full length liners is the same as one would get by holding three playing cards tightly together at one point and then flexing their ends back and forth. The middle card would float between the two outer cards and move equally with relation to each of the two outer cards. And that also is exactly the action which is provided by this invention.

Examination of full length liners, after more than fifty thousand miles of usage between the leaves of a spring, has shown that there has been no pressure whatsoever between the leaves and the liner except at the center of the liners and for a distance varying from 3 to 5 inches at the tip ends of the liners. Thus it is seen that only at the ends of the liners is any frictional work done. In short, my invention gives results identical with full length liners at a fraction of the cost of such liners.

Referring to the drawings and in particular to the view shown in Fig. 3, it will be noted that the relationship between projection 3 and hole 4, while permitting limited longitudinal movements between the friction bearing structure and the spring end, will hold the bearing structure against lateral displacement and also against relative turning movements.

In addition to the great cost saving made possible by my invention as compared to full length liners, another very important advantage is obtained in that replaceability of any worn bearing structure can be accomplished without removal or dismemberment of the spring. With a leaf spreader the removal of a worn bearing structure and the installation of a new one can be accomplished in a few minutes. The terms "elongated" and "straight-sided," as employed in connection with this application and the claims, are to be considered as applying to a horizontal characteristic and not necessarily to a vertical characteristic.

Having thus described my invention and pointed out a few of its uses by way of example, I claim:

1. In combination, two adjacent leaves of a leaf spring, a leaf-end friction bearing structure between said leaves and presenting to at least one of them a surface of sufficient yieldability to conform to irregularities thereof, said bearing structure being held in predetermined limited position between said leaves exclusively by anchoring means associated with said bearing structure and but one of said leaves adjacent an end thereof, said anchoring means acting also to interlock said bearing structure and said one leaf in a manner to permit, during flexing of the spring, appreciable longitudinal movements in shear between said bearing structure and both of said leaves yet limiting the extent of such movements with relation to said one leaf, said anchoring means acting also to limit lateral and turning movements of said bearing structure with relation to said one leaf.

2. In combination, two adjacent leaves of a leaf spring, a leaf-end friction bearing structure between said leaves and presenting to both of them a surface of sufficient yieldability to conform to irregularities thereof, and anchoring means acting to limit longitudinal, lateral and turning movements of said bearing structure with relation to said leaves while in service, said anchoring means comprising an anchoring device in predetermined limited position with relation to said bearing structure and in meshed engagement with one of said leaves adjacent an end thereof, said anchoring means acting to interlock said bearing structure and said one leaf in a manner to permit, during flexing of the spring, appreciable longitudinal movements in shear between said bearing structure and both of said leaves.

3. In combination, two adjacent leaves of a leaf spring, a leaf-end friction bearing structure spacing said leaves and presenting to at least one of them a surface of sufficient yieldability to conform to irregularities thereof, said bearing structure being held in predetermined position between said leaves exclusively by anchoring means interengaging said bearing structure and but one of said leaves adjacent an end thereof, said anchoring means acting to interlock said bearing structure and said one leaf in a manner to permit, during flexing of the spring, appreciable longitudinal movements in shear between said bearing structure and both of said leaves yet positively limiting the extent of such movements with relation to said one leaf, said anchoring means acting also to limit lateral and turning movements of said bearing structure with relation to said one leaf, said anchoring means comprising a medium of soft rubber or rubber-like material, and said appreciable longitudinal movement in shear between said bearing structure and said one leaf being accommodated in whole or in part by deformation of said soft rubber or rubber-like material.

4. In combination, two adjacent leaves of a leaf spring, a leaf-end friction bearing structure spacing said leaves and presenting to at least one of them a surface of sufficient yieldability to conform to irregularities thereof, said bearing structure being held in predetermined position between said leaves exclusively by anchoring means interengaging with said bearing structure and but one of said leaves adjacent an end thereof, said anchoring means acting also to interlock said bearing structure and said one leaf in a manner to permit, during flexing of the spring, appreciable longitudinal movements in shear between said bearing structure and both of said leaves yet positively limiting the extent of such movements with relation to said one leaf, said anchoring means acting also to limit lateral and turning movements of said bearing structure with relation to said one leaf, said anchoring means comprising a medium of deformable material, and said appreciable longitudinal movements in shear between said bearing structure and said one leaf being accommodated in whole or in part by deformation of said material.

5. In combination, two adjacent leaves of a leaf spring, a leaf-end friction bearing structure spacing said leaves and presenting to at least one of them a surface of sufficient yieldability to conform to irregularities thereof, and anchoring means limiting longitudinal, lateral and turning movements of said bearing structure with relation to one of said leaves, said anchoring means comprising a soft rubber anchor member in deep penetrative engagement with a through hole provided in said bearing structure and also in deep penetrative engagement with a hole provided in said one leaf adjacent an end thereof and means holding said anchor member in predetermined vertical position within said holes, the horizontal cross sectional area of one of said holes being greater than the mean horizontal cross sectional area of that portion of said anchor member which is positioned within that hole.

6. In combination, two adjacent leaves of a leaf spring, a leaf-end friction bearing structure spacing said leaves and presenting to at least one of them a surface of sufficient yieldability to conform to irregularities thereof, and anchoring means limiting longitudinal, lateral and turning movements of said bearing structure with relation to one of said leaves, said anchoring means comprising a soft rubber anchor member in deep penetrative engagement with a through hole provided in said bearing structure and also in deep penetrative engagement with a hole provided in said one leaf adjacent an end thereof and means holding said anchor member in predetermined vertical position within said holes, said two holes respectively being of different horizontal cross sectional area and the horizontal cross sectional area of one of them being greater than the mean horizontal cross sectional area of that portion of said anchor member which is positioned within that hole.

7. In combination, two adjacent leaves of a leaf spring, a leaf-end friction bearing structure spacing said leaves and presenting to at least one of them a surface of sufficient yieldability to conform to irregularities thereof, and anchoring means limiting longitudinal, lateral and turning movements of said bearing structure with relation to one of said leaves, said anchoring means comprising a horizontally elongated soft rubber anchor member in deep penetrative engagement with a horizontally elongated through hole provided in said bearing structure and also in deep penetrative engagement with a horizontally elongated and round-ended hole provided in said one leaf adjacent an end thereof and means holding said anchor member in predetermined vertical position within said holes, said two holes respectively being of different horizontal cross sectional area and the horizontal cross sectional area of one of them being greater than the mean horizontal cross sectional area of that portion of said anchor member which is positioned within that hole.

8. In combination, two adjacent leaves of a leaf spring, a leaf-end friction bearing structure between said leaves and presenting to at least one of them a surface of sufficient yieldability to conform to irregularities thereof and mechanical anchoring means providing adequate factors of engagement with said bearing structure and with one of said leaves adjacent an end thereof for limiting longitudinal, lateral and turning movements of said bearing structure with relation to said leaves while in service, said anchoring means comprising an anchor member attached solely and per se to said bearing structure and being extrinsic thereto and in acting meshed engagement therewith and with one of said leaves adjacent an end thereof while in service, the nature of the structural engagement between said anchoring means and said leaf making possible with reasonable facility, the initial anchoring of said bearing structure with relation to said leaf and/or for replacement purposes and without removing the spring from its position, the removal of said bearing structure from between said leaves and, where necessary, the removal of said anchoring means from between said leaves.

9. In combination, two adjacent leaves of a leaf spring, a leaf-end friction bearing structure between said leaves and presenting to at least one of them a surface of sufficient yieldability to conform to irregularities thereof, and anchoring means providing adequate factors of engagement with said bearing structure and with one of said leaves adjacent an end thereof for limiting longitudinal, lateral and turning movements of said bearing structure with relation to said leaves while in service, said entire anchoring means being mechanical and comprising an approximately straight-sided anchor member extrinsic to said bearing structure and attached thereto and in meshed engagement with an approximately straight-sided hole in one of said leaves adjacent an end thereof, the nature of the structural engagement between said anchoring means and said leaf making possible with reasonable facility the initial anchoring of said bearing structure with relation to one of said leaves and/or, for replacement purposes and without removing the spring from its position, the removal of said bearing structure from between said leaves and, where necessary, the removal of said anchoring means from between said leaves.

10. In combination, two adjacent leaves of a leaf spring, a leaf-end friction bearing structure between said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member in acting meshed engagement with one of said leaves adjacent an end thereof and in acting meshed engagement with said bearing structure.

11. In combination, two adjacent leaves of a leaf spring, a leaf-end friction bearing structure between said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member supported from the upper side of said bearing structure and in acting meshed engagement with said bearing structure and with one of said leaves adjacent an end thereof.

12. In combination, two adjacent leaves of a leaf spring, a leaf-end friction bearing structure between said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising an elongated soft rubber anchor member supported from the upper side of said bearing structure and in acting meshed engagement with said bearing structure and with one of said leaves adjacent an end thereof.

13. In combination, two adjacent leaves of a leaf spring, a leaf-end friction bearing structure between said leaves and presenting to at least one of them a surface of sufficient yieldability to conform to irregularities thereof and anchoring means for limiting longitudinal, lateral and turning movements of said bearing structure with relation to said leaves while in service, said anchoring means comprising two anchor parts one of which is of soft rubber or rubber-like material and each of which is in predetermined limited position with relation to said bearing structure and in acting meshed engagement with one of said leaves adjacent an end thereof.

14. In combination, two adjacent leaves of a leaf spring, a leaf-end friction bearing structure between said leaves and presenting to at least one of them a surface of sufficient yieldability to conform to irregularities thereof, and mechanical anchoring means for maintaining said bearing structure in predetermined limited position with relation to said leaves while in service, said anchoring means comprising an anchoring device of soft rubber or rubber-like material in predetermined limited position with relation to said bearing structure and in acting meshed engagement with one of said leaves adjacent an end thereof.

15. In combination, two relatively reciprocating load-supporting bodies associated with the suspension mechanism of a vehicle, a friction bearing structure between said bodies and presenting to at least one of them a surface of sufficient yieldability to conform to irregularities thereof and exhibiting frictional properties whereof the static and dynamic coefficients of friction are sufficiently in balance to avoid setting up destructive spasmodic actions and/or objectionable noise-producing vibrations, and mechanical anchoring means for maintaining said bearing structure in predetermined limited position with relation to one of said bodies while in service, said anchoring means comprising an anchoring device of soft rubber or rubber-like material in predetermined limited position with relation to said bearing structure and in acting meshed engagement with one of said bodies.

16. In combination, two adjacent leaves of a leaf spring, a leaf-end friction bearing structure between said leaves and contacting both of them and presenting to at least one of them a surface of sufficient yieldability to conform to irregularities thereof, and anchoring means for limiting longitudinal, lateral and turning movements of said bearing structure with relation to said leaves while in service, said anchoring means comprising a rectangular-shaped rubber or rubber-like anchor member in deep penetrative engagement with both a preformed through hole in said bearing structure and a hole in one of said leaves adjacent an end thereof, said anchor member comprising means integral therewith and extending at right angles therefrom and engaging a portion of the surface of one side of said bearing structure in a manner to prevent movement of said anchor member through said holes in a direction toward the opposite side of said bearing structure.

17. In combination, two adjacent leaves of a leaf spring, a leaf-end friction bearing structure between said leaves and presenting to at least one of them a surface of sufficient yieldability to conform to irregularities thereof, and anchoring means maintaining said bearing structure in working limited position with relation to said leaves while in service, said entire anchoring means being mechanical and comprising two anchor members one of which is in meshed engagement with one of said leaves adjacent an end thereof and the other of which is in meshed engagement with preformed opening means positioned in said bearing structure and both of which are in meshed engagement one with the other.

18. In combination, two immediately adjacent leaves of a leaf spring, a leaf-end friction bearing structure positioned majorly between said leaves and presenting to at least one of them a surface of sufficient yieldability to conform to irregularities thereof, and mechanical anchoring means providing adequate factors of engagement with said bearing structure and with one of said leaves adjacent an end thereof for limiting longitudinal, lateral and turning movements of said bearing structure with relation to said leaves while in service, said anchoring means comprising two relatively spaced anchor parts each of which is in predetermined limited position with relation to said bearing structure and in acting meshed engagement with one of said leaves adjacent an end thereof, the nature of the structural engagement between each anchor part and leaf making possible with reasonable facility, the initial anchoring of said bearing structure with relation to one of said leaves and/or, for replacement purposes and without removing the spring from its position, the removal of said bearing structure from between said leaves and, where necessary, the removal of said anchoring means from between said leaves.

19. In combination, two adjacent leaves of a leaf spring, a leaf-end friction bearing structure between said leaves and contacting both of them and presenting to at least one of them a surface of sufficient yieldability to conform to irregularities thereof, and mechanical anchoring means providing adequate factors of engagement with said bearing structure and with one of said leaves adjacent and end thereof for limiting longitudinal, lateral and turning movements of said bearing structure with relation to said leaves while in service, said anchoring means comprising an anchor member in acting meshed engagement with said bearing structure and with one of said leaves adjacent an end thereof, the nature of the structural engagement between said anchoring means and said leaf permitting the making of any advantageous change in the size of acting portions of said anchoring means without disadvantageously affecting facility as regards, the initial anchoring of said bearing structure with relation to said leaf and/or, for replacement purposes and without removing the spring from its position, the removal of said bearing structure from between said leaves and, where necessary, the removal of said anchoring means from between said leaves.

20. In combination, two adjacent leaves of a leaf spring, a leaf-end friction bearing structure between said leaves and presenting to at least one of them a surface of sufficient yieldability to conform to irregularities thereof, and mechanical anchoring means providing adequate factors of engagement with said bearing structure and with one of said leaves adjacent an end thereof for limiting any and all longitudinal, lateral and turning movements of said bearing structure with relation to said leaves while in service, said anchoring means comprising an anchor member extrinsic to said bearing structure and, per se, supported by said bearing structure and in predetermined limited position with relation thereto and in acting meshed engagement with one of said leaves adjacent an end thereof, the nature of the structural engagement between said anchoring means and said leaf making possible with reasonable facility, the initial anchoring of said bearing structure with relation to said leaf and/or, for replacement purposes and without removing the spring from its position, the removal of said bearing structure from between said leaves and, where necessary, the removal of said anchoring means from between said leaves.

21. In combination, two adjacent leaves of a leaf spring, a leaf-end friction bearing structure between said leaves and presenting to at least one of them a surface of sufficient yieldability to conform to irregularities thereof, and anchoring means providing adequate factors of engagement with said bearing structure and with one of said leaves adjacent an end thereof for maintaining said bearing structure in working limited position between said leaves while in service, said entire anchoring means being mechanical and extrinsic to said bearing structure and comprising an anchor member in acting meshed engagement with one of said leaves adjacent an end thereof and in acting meshed engagement with said bearing structure and presenting preformed and substantially flat flange means embedded in said bearing structure, said entire flange means coinciding with a common plane and extending laterally from and at approximately right angles to the body portion of said anchor member, the nature of the structural engagement between said anchoring means and said leaf making possible with reasonable facility, the initial anchoring of said bearing structure with relation to said leaf and/or, for replacement purposes and without removing the spring from its position, the removal of said bearing structure from between said leaves and, where necessary, the removal of said anchoring means from between said leaves.

22. In combination, two adjacent leaves of a leaf spring, leaf-end friction bearing means between said leaves and presenting to at least one of them a surface of sufficient yieldability to conform to irregularities thereof, and mechanical anchoring means providing adequate factors of engagement with said bearing means and with one of said leaves adjacent an end thereof for maintaining said bearing means in predetermined limited position with relation to said leaves while in service, said anchoring means comprising two anchor members each of which is extrinsic to said bearing means and in predetermined limited position with relation thereto and in acting meshed engagement with one of said leaves adjacent an end thereof, the nature of the structural engagement between each anchor member and leaf making possible with reasonable facility the initial anchoring of said bearing means with relation to one of said leaves and/or, where necessary for replacement purposes and without removing the spring from its position, the removal of said bearing means from between said leaves and, where necessary, the removal of said anchoring means from between said leaves.

23. In combination, two adjacent leaves of a leaf spring, a leaf-end friction bearing structure between said leaves and presenting to at least one of them a surface of sufficient yieldability to conform to irregularities thereof, and mechanical anchoring means providing adequate factors of engagement with said bearing structure and with one of said leaves adjacent an end thereof for limiting longitudinal, lateral and turning movements of said bearing structure with relation to said leaves while in service, said anchoring means comprising an anchor member extrinsic to said bearing structure and attached per se to said bearing structure and in acting meshed engagement with one of said leaves adjacent an end thereof, the nature of the structural engagement between said anchoring means and said leaf making possible with reasonable facility, the initial anchoring of said bearing structure with relation to said leaf and/or, for replacement purposes and without removing the spring from its position, the removal of said bearing structure from between said leaves and, where necessary, the removal of said anchoring means from between said leaves.

24. In combination, two adjacent leaves of a leaf spring, a leaf-end friction bearing structure between said leaves and presenting to at least one of them a surface of sufficient yieldability to conform to irregularities thereof, and mechanical anchoring means providing adequate factors of engagement with said bearing structure and with one of said leaves adjacent an end thereof for maintaining said bearing structure in predetermined limited position with relation to said leaves while in service, said anchoring means comprising a soft rubber anchor member attached to said bearing structure and in acting meshed engagement with one of said leaves adjacent an end thereof.

25. In mechanism for positionment majorly between and for frictionally resisting movements between two immediately adjacent leaves of a leaf spring, a leaf-end friction bearing structure of appreciably greater length than width and equipped to present to at least one of said leaves a surface of sufficient yieldability to conform to irregularities thereof and frictional properties whereof the static and dynamic coefficients of friction are sufficiently in balance to avoid setting up destructive spasmodic actions and/or objectionable noise-producing vibrations, said bearing structure also presenting preformed opening means for cooperating with mechanical anchoring means for limiting longitudinal, lateral and turning movements of said bearing structure with relation to such leaves while in service, and which anchoring means is suitable for predetermined, all-movement-limiting positionment with relation to one of said leaves solely adjacent an end thereof.

26. In combination, two immediately adjacent leaves of a leaf spring, a leaf-end friction bearing structure of appreciably greater length than width and having a major portion thereof disposed between said leaves and presenting to at least one of them a surface of sufficient yieldability to conform to irregularities thereof and also presenting thereto frictional properties whereof the static and dynamic coefficients of friction are sufficiently in balance to avoid setting up destructive spasmodic actions and/or objectionable noise-producing vibrations, and mechanical anchoring means providing positive limits to any and all longitudinal, lateral and turning movements of said bearing structure with relation to said leaves while in service.

JOHN W. WATSON.

REFERENCES CITED

The following references are of record in the file of this patent:

UNITED STATES PATENTS

| Number | Name | Date |
| --- | --- | --- |
| 1,336,752 | Muller | Apr. 13, 1920 |
| 1,443,545 | Lord | Jan. 30, 1923 |
| 1,796,433 | Blume | Mar. 17, 1931 |
| 2,028,299 | Swinton | Jan. 21, 1936 |
| 2,162,718 | Hasche | June 20, 1939 |
| 2,280,201 | Thompson | Apr. 21, 1942 |
| 2,299,873 | Beckel et al. | Oct. 27, 1942 |
| 2,308,754 | Hasche | Jan. 19, 1943 |
| 2,317,291 | McIntyre | Apr. 20, 1943 |
| 2,319,172 | Watson et al. | May 11, 1943 |

FOREIGN PATENTS

| Number | Country | Date |
| --- | --- | --- |
| 286,330 | Great Britain | Feb. 29, 1928 |
| 474,995 | Great Britain | Nov. 11, 1937 |